Patented June 15, 1948

2,443,284

UNITED STATES PATENT OFFICE 2,443,284

WRINKLE VARNISH

William A. Waldie, Oakwood, Ohio, assignor to New Wrinkle, Inc., Wilmington, Del., a corporation of Delaware No Drawing. Application June 11, 1945, Serial No. 598,895

14 Claims. (Cl. 106—222)

This invention relates to wrinkle finishes, and more particularly to wrinkle finishes prepared from non-drying oils, such as cottonseed and peanut oils, to produce varnishes which will yield a wrinkle surface when applied as a coating and dried.

I have found that by reacting compounds such as propylene glycol with non-drying oils, and thereafter further reacting the reaction product thus obtained with polycarboxylic acids, wrinkle finishes of pleasing texture are obtained when the resulting composition is further compounded in the usual manner with the other ingredients customary for making wrinkle drying coating compositions.

The following examples serve to illustrate my invention without limiting it to the specific details given therein.

Example I

Sixteen pounds of propylene glycol and 80 pounds of cottonseed oil were mixed and heated at a temperature of from 350° F. to 360° F. until a drop of the liquid put on a glass plate was found to be clear and thus the mixture to be homogeneous. Thereafter, 16 pounds of fumaric acid were added to the mixture and the batch then heated to 500° F. and held at 500° F. to 510° F. for approximately 30 minutes when the mass had the viscosity J as on the Gardner-Holdt scale. Ten gallons of the oil mixture obtained above were then mixed with 50 pounds of Fine Melt Congo resin and this mixture heated to a temperature of from 580° F. to 590° F. for approximately 30 minutes. Then the heating was discontinued and about half a pound of cobalt acetate added. This mixture was allowed to cool down to 400° F. whereafter 12 gallons of high solvency petroleum naphtha were added.

The varnish obtained had a viscosity of J on the Gardner-Holdt scale. When sprayed on a piece of metal, wood, or the like and baked at the customary baking temperature of from approximately 140° F. to 280° F. or by infrared heat, the varnish yielded a hard coating of a very fine wrinkle texture.

The "fine melt Congo" resin used in the above example is a natural Congo resin which has been rendered oil soluble by fusion until approximately one third of the components are volatilized.

Example II

One hundred and twelve pounds of cottonseed oil and 24 pounds of propylene glycol were heated as described in Example I whereupon 24 pounds of fumaric acid were added. After the batch was heated for about 30 minutes at a temperature between 490° F. and 530° F. it had a viscosity of T as on the Gardner-Holdt scale.

Ten gallons of this oil mixture were then mixed with 50 pounds of fused Congo resin, and the mass was heated to a temperature of from 560° F to 610° F. for about 40 minutes. The heating was discontinued and half a pound of cobalt acetate added. After the mixture had cooled to approximately 400° F., 12 gallons of high solvency petroleum naphtha were added. The composition obtained had the viscosity L, and a film made from the composition showed excellent hardness and a wrinkle surface of very fine texture.

It will be understood that, instead of cottonseed oil, peanut oil and other non-drying oils or mixtures of these may be used for the purpose of my invention with equal satisfaction. Thus, for example castor oil has proven usable.

Instead of propylene glycol, other glycols may be added, e. g., ethylene glycol, diethylene glycol, triethylene glycol or polyethylene glycol without departing from the scope of the invention. Likewise, the proportions of the ingredients may be modified. Thus, the addition of propylene glycol in amounts of from 10 to 30% has been found advantageous and satisfactory.

Furthermore, other polycarboxylic acids may be used in place of the fumaric acid. Maleic acid and phthalic acid and their anhydrides, for example, have proven suitable. Quantities of approximately from 10 to 30% have given satisfactory results.

As solvents, any kinds of high solvency aromatic and petroleum hydrocarbons may be used. Xylol, toluol and the high solvency petroleum naphtha sold by Shell Chemical Company under the name "TN25 Solvent" have given satisfactory results.

As drier, other salts than cobalt acetate, which are common to the art, are suitable. For example, manganese borate and cobalt naphthenate have been used successfully.

It will be also understood that Congo resin may be replaced by other natural resins such as Kauri, East Indies, Batu, etc., or by oil soluble synthetic resins.

By the present invention a method has been devised by which wrinkle finishes can be produced from products plentifully available and inexpensive and which is relatively simple so that it can be carried out without difficulty by unskilled workmen.

It will be understood that while there have been described herein certain embodiments of the present invention, it is not intended thereby to have this invention limited to or circumscribed by the specific details of procedure, materials and conditions set forth since this invention may be modified according to individual preference and conditions without departing from the spirit of this disclosure and the scope of the appended claims.

I claim:

1. A method of producing a wrinkling oil composition from non-wrinkling oils consisting in heating a glycol with a non-conjugated double-bonded oil at a temperature of from 350 to 360° F. until a homogeneous mixture has been obtained, and thereafter heat-reacting the resulting composition with polycarboxylic acid at 490 to 530° F.

2. A method of producing a wrinkling oil composition from non-conjugated double-bonded oils consisting in heating a glycol with a non-conjugated double-bonded oil at a temperature of from 350 to 360° F. until a homogeneous mixture has been obtained, and thereafter heat-reacting the resulting composition with fumaric acid at 490 to 530° F.

3. A method of producing a wrinkling oil composition from peanut oil consisting in heating a glycol with the oil at a temperature of from 350 to 360° F. until a homogeneous mixture has been obtained, and thereafter heat-reacting the resulting composition with polycarboxylic acid at 490 to 530° F.

4. A method of producing a wrinkling oil composition from cottonseed oil consisting in heating a glycol with said oil at a temperature of from 350 to 360° F. until a homogeneous mixture has been obtained, and thereafter heat-reacting the resulting composition with a polycarboxylic acid at 490 to 530° F.

5. A method of producing a wrinkling oil composition from non-wrinkling oil consisting in heating propylene glycol with a non-conjugated double-bonded oil at a temperature of from 350 to 360° F. until a homogeneous mixture has been obtained, and thereafter heat-reacting the resulting composition with polycarboxylic acid at 490 to 530° F.

6. A method of producing a wrinkling oil composition from non-conjugated oil consisting in heating from 10 to 30 parts by weight propylene glycol with 100 parts non-conjugated double-bonded oil at a temperature of from 350 to 360° F. until a homogeneous mixture has been obtained, and thereafter heat-reacting the resulting composition with polycarboxylic acid at 490 to 530° F.

7. A method of producing a wrinkling oil composition from cotton seed oil consisting in heating approximately 20% of propylene glycol with 100 parts of said oil at a temperature of from approximately 350° to 360° F. until a homogeneous mixture has been obtained, and thereafter heat-reacting the resulting composition with polycarboxylic acid at 490 to 530° F.

8. A method of producing a wrinkling oil composition from non-wrinkling oil consisting in heating a glycol with a non-conjugated double-bonded oil at a temperature of from 350 to 360° F. until a homogeneous mixture has been obtained, adding thereafter 10 to 30% polybasic acid to the batch, and heating to a temperature of from 490° F. to 530° F. for approximately 30 minutes.

9. A method of producing a wrinkling oil composition from non-wrinkling oil consisting in heating a glycol with a non-conjugated double-bonded oil at a temperature of from 350 to 360° F. until a homogeneous mixture has been obtained, adding thereafter 10 to 30% of fumaric acid to the batch, and heating to a temperature of from 490° F. to 530° F. for approximately 30 minutes.

10. A method of making wrinkle finish coating composition comprising heating cottonseed oil with 10–30% of a glycol at a temperature of from 350 to 360° F. until a homogeneous mixture has been obtained, adding from 10 to 30% fumaric acid and heating to a temperature of from 490° to 530° F. for approximately 30 minutes; adding approximately 50 pounds of oil soluble resin for each 10 gallons of the oil mixture obtained, heating to a temperature of from 560° F. to 610° F. for approximately 30 minutes, adding drier, cooling the mixture to approximately 400° F. and adding thinner material.

11. A method of making a wrinkle finish coating composition comprising heating cottonseed oil with 10 to 30% propylene glycol at 350° F. to 360° F. until a homogeneous mixture has been obtained; adding from 10 to 30% by weight of fumaric acid and heating to a temperature of from 490° F. to 530° F. for approximately 30 minutes; adding thereafter approximately 50 pounds of oil-soluble resin per 10 gallons of the oil mixture obtained; heating the batch to a temperature of from 560° F. to 610° F. for approximately 30 minutes; adding drier; allowing the mixture to cool to approximately 400° F.; and then adding thinner solvent.

12. A wrinkling oil consisting of the heat reaction product of a solution of non-conjugated double-bonded oil and a glycol said solution having been formed at from 350° to 360° F., with polybasic acid, said heat reaction having been carried out at a temperature of from 490 to 530° F. for 30 minutes.

13. A wrinkling oil consisting of the heat reaction product of a solution of 100 parts by weight of non-conjugated double-bonded oil and 10 to 30 parts of propylene glycol said solution having been formed at from 350° to 360° F., with 10 to 30 parts by weight of fumaric acid, said heat reaction having been carried out at a temperature of from 490 to 530° F. for 30 minutes.

14. A wrinkling oil consisting of the heat reaction product of a solution of 10 to 30 parts by weight of propylene glycol in 100 parts by weight of cottonseed oil said solution having been formed at from 350° to 360° F., with 10 to 30 parts by weight of fumaric acid, said heat reaction having been carried out at a temperature of from 490 to 530° F. for 30 minutes.

WILLIAM A. WALDIE.

REFERENCES CITED

The following references are of record in the file of this patent:

UNITED STATES PATENTS

| Number | Name | Date |
|---|---|---|
| 2,041,248 | Hovey | May 19, 1936 |
| 2,044,747 | Ott | June 16, 1936 |
| 2,069,252 | Kittredge et al. | Feb. 2, 1937 |
| 2,195,362 | Ellis | Mar. 26, 1940 |
| 2,206,171 | Ellis | July 2, 1940 |
| 2,260,140 | Gerin | Oct. 21, 1941 |